US010797631B2

(12) United States Patent
Nawa

(10) Patent No.: US 10,797,631 B2
(45) Date of Patent: Oct. 6, 2020

(54) POWER OUTPUT DEVICE

(71) Applicant: KABUSHIKI KAISHA TOYOTA JIDOSHOKKI, Kariya-shi, Aichi-ken (JP)

(72) Inventor: Masamichi Nawa, Kariya (JP)

(73) Assignee: KABUSHIKI KAISHA TOYOTA JIDOSHOKKI, Kariya-shi, Aichi-ken (JP)

(*) Notice: Subject to any disclaimer, the term of this patent is extended or adjusted under 35 U.S.C. 154(b) by 21 days.

(21) Appl. No.: 16/307,058

(22) PCT Filed: Jun. 5, 2017

(86) PCT No.: PCT/JP2017/020786
§ 371 (c)(1),
(2) Date: Dec. 4, 2018

(87) PCT Pub. No.: WO2017/213073
PCT Pub. Date: Dec. 14, 2017

(65) Prior Publication Data
US 2019/0165714 A1 May 30, 2019

(30) Foreign Application Priority Data
Jun. 10, 2016 (JP) ................. 2016-116156

(51) Int. Cl.
H02P 1/00 (2006.01)
H02P 27/06 (2006.01)
H02P 6/32 (2016.01)
H02P 25/16 (2006.01)
H02P 6/14 (2016.01)
(Continued)

(52) U.S. Cl.
CPC .............. *H02P 27/06* (2013.01); *H02M 1/34* (2013.01); *H02M 3/158* (2013.01);
(Continued)

(58) Field of Classification Search
CPC .. H02P 2201/09; H02P 2209/01; H02P 25/16; H02P 25/22; H02P 27/06; H02P 6/14; H02P 6/32
See application file for complete search history.

(56) References Cited

U.S. PATENT DOCUMENTS 4,684,818 A * 8/1987 Carlson ................. H02J 7/1438
307/10.1
6,066,928 A 5/2000 Kinoshita et al.
(Continued)

FOREIGN PATENT DOCUMENTS

EP 2 062 801 A1 5/2009
JP 2010-068598 A 3/2010
(Continued)

OTHER PUBLICATIONS

International Search Report of PCT/JP2017/020786 dated Sep. 5, 2017.
(Continued)

*Primary Examiner* — Muhammad S Islam
(74) *Attorney, Agent, or Firm* — Sughrue Mion, PLLC

(57) ABSTRACT

This power output device is provided with: a field winding; a motor having a plurality of star-connected motor windings composed of three or more phases; a capacitor; an inverter circuit configured to perform power conversion on the power supplied from the capacitor and to supply the converted power to the motor windings; a battery connected to the field winding; and a control unit. The inverter circuit has a plurality of switching element pairs that correspond to the respective motor windings. The capacitor is connected to a positive bus bar and a negative bus bar. The field winding is connected to the positive or negative bus bar and to a neutral point of the motor. The control unit is configured to control the switching element pairs so as to charge the capacitor by boosting the voltage of the battery and to supply a direct current to the field winding.

6 Claims, 3 Drawing Sheets

(51) Int. Cl.
    *H02M 1/34*     (2007.01)
    *H02M 3/158*     (2006.01)
    *H02M 7/5387*     (2007.01)
    *H02P 25/22*     (2006.01)
    *H02M 3/155*     (2006.01)

(52) U.S. Cl.
    CPC ............ *H02M 7/5387* (2013.01); *H02P 6/14* (2013.01); *H02P 6/32* (2016.02); *H02P 25/16* (2013.01); *H02P 25/22* (2013.01); *H02M 2001/346* (2013.01); *H02M 2003/1552* (2013.01); *H02P 2201/09* (2013.01); *H02P 2209/01* (2013.01)

(56) References Cited

U.S. PATENT DOCUMENTS

2010/0071971 A1*   3/2010   Tatematsu ............ H02K 1/2746
                                                                           180/65.8
2015/0043251 A1*   2/2015   Hasegawa ........... H02M 3/1584
                                                                           363/21.12

FOREIGN PATENT DOCUMENTS

| JP | 2013-201869 A | 10/2013 |
| JP | 2016-019327 A | 2/2016 |

OTHER PUBLICATIONS

International Preliminary Report on Patentability and Translation of Written Opinion, dated Dec. 11, 2018 from the International Bureau in counterpart International application No. PCT/JP2017/020786.

\* cited by examiner (Prior Art)

POWER OUTPUT DEVICE

CROSS REFERENCE TO RELATED APPLICATIONS

This application is a National Stage of International Application No. PCT/JP2017/020786 filed Jun. 5, 2017, claiming priority based on Japanese Patent Application No. 2016-116156 filed Jun. 10, 2016.

TECHNICAL FIELD

The present invention relates to a power output device; more specifically, a power output device that includes a motor having an armature winding (field winding).

BACKGROUND ART

There is a need for direct current to flow through a motor having an armature winding (field winding). Accordingly, a dedicated circuit (switch and the like) is necessary to produce a flow of direct current. Patent document 1 discloses a motor-driving device that supplies a U-phase coil U, a V-phase coil V, and a W-phase coil W of a motor 81 with alternating current via an inverter 82, as shown in FIG. 6. Further, a field winding 83 of the motor 81 is located in a current passage between a battery B and a power line 84 and functions as a reactor L1 for a step-up converter 85. The step-up converter 85 includes the reactor L1, a switching element Q1, and a switching element Q2. A controller 86 calculates a target value of an input current flowing into the power line 84 based on the deviation between a voltage command value and a detection voltage value detected by a voltage sensor 87. Further, the controller 86 calculates a target value of a field increasing current that flows to the field winding 83 in accordance with the deviation between a current command value and a detection current value detected by a current sensor 88. The controller 86 generates the current command value by adding a motor output current value, which is a feed-forward compensation term, to a total value of the target value for the input current and the target value for the field current. Further, the controller 86 controls switching of the switching elements Q1, Q2, and Q3 so that the detection current value from the current sensor 88 matches the current command value.

Patent document 2 presents a rotary electric machine that includes a three-phase armature winding, a field winding used to generate a magnetic field, and a field reinforcement permanent magnet arranged in only a stator core.

PRIOR ART LITERATURE

Patent Literature

Patent Document 1: Japanese Laid-Open Patent Publication No. 2010-68598
Patent Document 2: Japanese Laid-Open Patent Publication No. 2013-201869

SUMMARY OF THE INVENTION

Problem to be Solved by the Invention

A field winding regulates a motor magnetic field, reduces the size of a motor, and increases the output of the motor. However, the structure of patent document 1 requires a dedicated circuit that controls the current flowing in the field winding and thereby raises costs.

One object of the present invention is to provide a power output device through which the necessary current flows to the field winding without using a dedicated circuit.

Means for Solving the Problem

A power output device that achieves the above object includes a field winding, a motor including a plurality of star-connected motor windings having three or more phases, a capacitor, an inverter circuit, a battery, and a controller. The inverter circuit is configured to convert electric power supplied from the capacitor and supply the converted electric power to the motor windings. The battery is connected to the field winding. The inverter circuit includes a positive bus bar, a negative bus bar, and a plurality of switching element pairs respectively corresponding to the motor windings. The switching element pairs each include an upper arm switching element and a lower arm switching element that are connected in series to each other. The capacitor is connected to the positive bus bar and the negative bus bar. The field winding is connected to the positive bus bar or the negative bus bar and a neutral point of the motor. The controller is configured to control the switching element pairs to charge the capacitor by stepping up the voltage of the battery and to supply direct current to the field winding.

EMBODIMENTS OF THE INVENTION

A power output device according to one embodiment will now be described with reference to FIG. 1.

Figure 1:
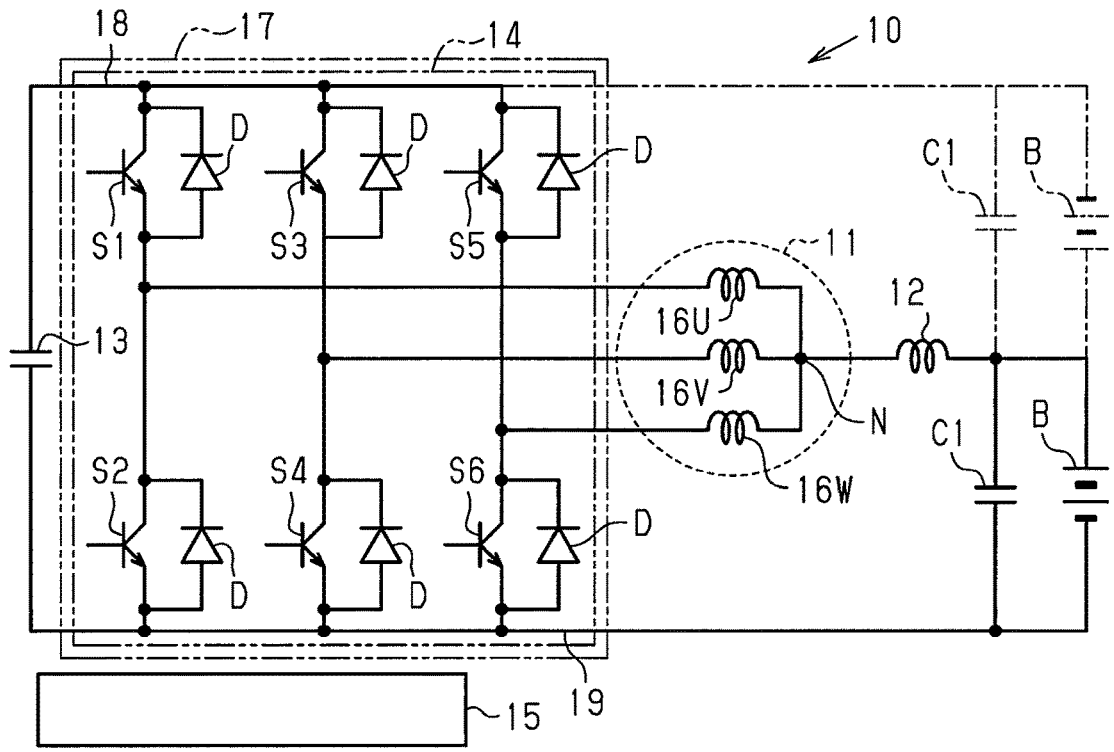
FIG. 1 is a circuit diagram of a power output device according to one embodiment.

As shown in FIG. 1, a power output device 10 includes a motor 11 (rotary electric machine), a field winding 12, a capacitor 13, an inverter circuit 14, and a controller 15. The inverter circuit 14 converts electric power from the capacitor 13 and supplies the converted electric power to a motor winding of the motor 11. The controller 15 controls the inverter circuit 14. The motor 11 includes a plurality of star-connected motor windings having three or more phases. In the present embodiment, the motor 11 includes windings 16U, 16V, and 16W for the three phases. The inverter circuit 14 converts direct current (DC) power from the capacitor 13 to alternating current (AC) power and supplies the AC power to the motor windings 16U, 16V, and 16W. The capacitor 13 and the inverter circuit 14 configure an inverter 17.

The inverter circuit 14 includes three switching element pairs S1-S2, S3-S4, and S5-S6 corresponding to the three-phase motor windings 16U, 16V, and 16W, respectively. The two series-connected switching elements S1 and S2 configure the switching element pair S1-S2. The two series-connected switching elements S3 and S4 configure the switching element pair S3-S4. The two series-connected switching elements S5 and S6 configure the switching element pair S5-S6. Each of the switching elements S1 to S6 is, for example, an insulated-gate bipolar transistor (IGBT).

More specifically, the three switching elements S1, S3, and S5 are upper arm switching elements, and the three switching elements S2, S4, and S6 are lower arm switching elements. The switching elements S1 to S6 each include a collector and an emitter between which a diode D is connected. The diode D includes an anode and a cathode. The anode is connected to the emitter of the corresponding one of the switching elements S1 to S6. The cathode is connected to the collector of the corresponding one of the switching elements S1 to S6.

The motor windings 16U, 16V, and 16W are star-connected. The switching element pair S1-S2 is configured by the upper arm switching element S1 and the lower arm switching element S2. The emitter of the upper arm switching element S1 is connected to the motor winding 16U at a side of the motor 11 opposite to a side where a neutral point N is connected. The switching element pair S3-S4 is configured by the upper arm switching element S3 and the lower arm switching element S4. The emitter of the upper arm switching element S3 is connected to the motor winding 16V at a side of the motor 11 opposite to a side where the neutral point N is connected. The switching element pair S5-S6 is configured by the upper arm switching element S5 and the lower arm switching element S6. The emitter of the upper arm switching element S5 is connected to the motor winding 16W at a side of the motor 11 opposite to a side where the neutral point N is connected. Thus, the inverter circuit 14 includes the switching element pairs S1-S2, S3-S4, and S5-S6 corresponding to the three-phase motor windings 16U, 16V, and 16W, respectively. Further, the switching element pairs S1-S2, S3-S4, and S5-S6 are each configured by an upper arm switching element and an lower arm switching element that are connected in series to each other.

The capacitor 13 is connected to a positive bus bar 18 and a negative bus bar 19 of the inverter circuit 14.

The power output device 10 includes the battery B that is connected to the field winding 12. The field winding 12 includes a first end that is connected to the neutral point N of the motor 11 and a second end that is connected to a positive terminal of the battery B. A negative terminal of the battery B is connected to the negative bus bar 19 of the inverter circuit 14. That is, the field winding 12 is connected to the negative bus bar 19 via the battery B. The battery B is connected in parallel to a snubber capacitor C1. That is, the field winding 12 is connected to the negative bus bar 19 of the inverter circuit 14 via the motor 11 or the snubber capacitor C1. The field winding 12 is arranged on a rotor (not shown) of the motor 11. Electric current is supplied to the field winding 12, for example, via a brush and a slip ring.

The controller 15 controls the switching element pairs S1-S2, S3-S4, and S5-S6 of the inverter circuit 14 to charge the capacitor 13 by stepping up the voltage of the battery B, which is connected to the field winding 12, and to supply direct current to the field winding 12. Further, when the controller 15 controls the switching element pairs S1-S2, S3-S4, and S5-S6, the inverter circuit 14 converts DC power supplied from the capacitor 13 to AC power and supplies the AC power to the motor windings 16U, 16V, and 16W. When the direct current is supplied from the capacitor 13 to the field winding 12 to drive the motor 11, the controller 15 actuates the inverter circuit 14 as a step-up converter or a step-down converter to regulate the voltage of direct current output from the capacitor 13 at a target voltage.

The power output device 10 is, for example, used in an electric automobile. The battery B in the present embodiment is a low voltage battery for an electric automobile accessory.

The operation of the power output device 10 will now be described.

The capacitor 13 is charged by the battery B. The inverter circuit 14 converts the charged power and supplies the converted power to the field winding 12 and the motor windings 16U, 16V, and 16W. The upper arm switching elements S1, S3, and S5 and the lower arm switching elements S2, S4, and S6 are each turned on and off in predetermined cycles to supply current to the motor 11 and drive the motor 11.

When charging the capacitor 13, the current from the battery B flows via the field winding 12, the motor windings 16U, 16V, and 16W, and the inverter circuit 14 to the capacitor 13. In a state in which the upper arm switching elements S1, S3, and S5 of the inverter circuit 14 are all turned on and the lower arm switching elements S2, S4, and S6 of the inverter circuit 14 are all turned off, the current from the battery B flows via the field winding 12, the motor windings 16U, 16V, and 16W, and the inverter circuit 14 to the capacitor 13. However, torque is not applied to the motor 11 because current flows in the same state to each of the motor windings 16U, 16V, and 16W. In such a state, the power output device 10 duty-controls the lower arm switching elements S2, S4, and S6 to function as a step-up converter. This steps up the voltage of the battery B and charges the capacitor 13.

After the capacitor 13 is charged, power is converted by the inverter circuit 14 and supplied to the field winding 12 and the motor windings 16U, 16V, and 16W.

In a state in which the upper arm switching elements S1, S3, and S5 of the inverter circuit 14 are all turned off and the lower arm switching elements S2, S4, and S6 of the inverter circuit 14 are all turned on, current does not flow from the inverter circuit 14 to the motor windings 16U, 16V, and 16W.

In a state in which the upper arm switching elements S1, S3, and S5 of the inverter circuit 14 are all turned on and the lower arm switching elements S2, S4, and S6 are all turned off, current flows from the capacitor 13 via the inverter circuit 14 to the motor windings 16U, 16V, and 16W and the field winding 12. Torque is not applied to the motor 11 because current flows in the same state to each of the motor windings 16U, 16V, and 16W.

When the upper arm switching elements S1, S3, S5 are all turned on in a state in which the lower arm switching elements S2, S4, and S6 are all turned off, the voltage of the capacitor 13 is applied to the motor windings 16U, 16V, and 16W and the field winding 12. Then, when the upper arm switching elements S1, S3, S5 are all turned off, current flows via the diodes D, which are connected to the lower arm switching elements S2, S4, and S6, to the motor windings 16U, 16V, and 16W. Thus, the power output device 10 functions as a step-down converter.

In contrast, when the lower arm switching elements S2, S4, and S6 are all switched in a state in which the upper arm switching elements S1, S3, and S5 of the inverter circuit 14 are all turned on, the power output device 10 functions as a step-up converter.

In this manner, during a single cycle in which current is sequentially supplied to the motor windings 16U, 16V, and 16W, the power (current) supplied to the field winding 12 is adjusted by adjusting the duty of the switching elements S1 to S6 in a state in which either one of the upper arm switching elements S1, S3, and S5 and the lower arm switching elements S2, S4, and S6 are turned on and the other one of the upper arm switching elements S1, S3, and S5 and the lower arm switching elements S2, S4, and S6 are turned off. That is, the necessary current flows to the field winding 12 without using a dedicated circuit.

The above embodiment has the advantages described below.

(1) The power output device 10 includes the field winding 12, the motor 11, and the inverter circuit 14. The motor includes the star-connected motor windings 16U, 16V, and 16W for the three or more phases. The inverter circuit 14 converts power from the capacitor 13 and supplies the converted power to the motor windings 16U, 16V, and 16W. The inverter circuit 14 includes the switching element pairs S1-S2, S3-S4, and S5-S6 corresponding to the motor windings 16U, 16V, and 16W, respectively. The switching element pairs S1-S2, S3-S4, and S5-S6 include the upper arm switching elements and the lower arm switching elements that are connected to each other in series. The capacitor 13 is connected to the positive bus bar 18 and the negative bus bar 19 of the inverter circuit 14. The field winding 12 is connected to the negative bus bar 19 of the inverter circuit 14 and the neutral point N of the motor 11. Further, the power output device 10 includes the controller 15 that controls the switching element pairs S1-S2, S3-S4, and S5-S6 of the inverter circuit 14 to charge the capacitor 13 by stepping up the voltage of the battery B, which is connected to the field winding 12, and to supply the field winding 12 with direct current.

With this configuration, the switching element pairs S1-S2, S3-S4, and S5-S6 are controlled so that current from the battery B flows via the motor windings 16U, 16V, and 16W and the inverter circuit 14 to the capacitor 13. When duty-controlling the lower arm switching elements S2, S4, and S6 of the inverter circuit 14 in a state in which the upper arm switching elements S1, S3, and S5 and are all turned on, the inverter circuit 14 functions as a step-up converter. This steps up the voltage of the battery B and charges the capacitor 13.

Further, in a state in which the upper arm switching elements S1, S3, and S5 of the inverter circuit 14 are all turned off and the lower arm switching elements S2, S4, and S6 of the inverter circuit 14 are all turned on, the power output device 10 executes duty control to function as a step-up converter. After the capacitor 13 has been charged, in a state in which the upper arm switching elements S1, S3, and S5 of the inverter circuit 14 are all turned on and the lower arm switching elements S2, S4, and S6 of the inverter circuit 14 are all turned off, the power output device 10 executes duty control to function as a step-down converter. Accordingly, when the controller 15 controls the switching element pairs of the inverter circuit 14 so that direct current is supplied from the capacitor 13 to the field winding 12 to drive the motor 11, the controller 15 actuates the inverter circuit 14 as a step-up converter or a step-down converter so that the voltage of direct current output from the capacitor 13 is regulated at the target voltage. Thus, the necessary current flows to the field winding 12 without using a dedicated circuit in the power output device 10.

The above embodiment may be modified as described below.

Figure 2:
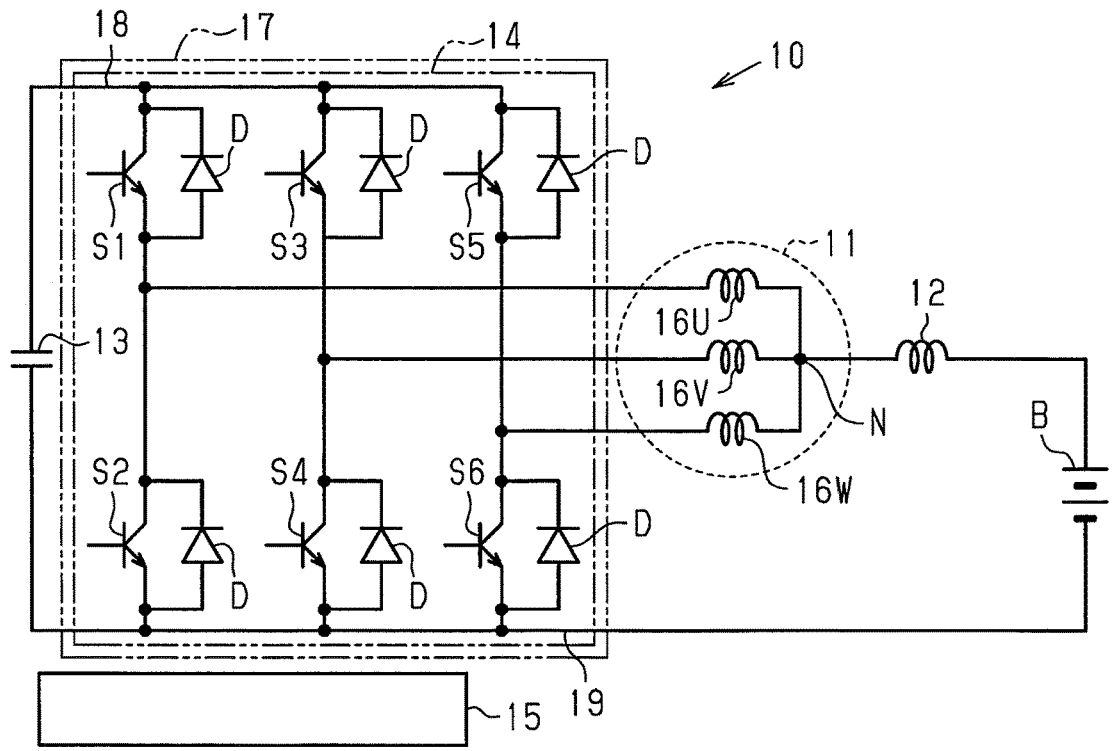
FIG. 2 is a circuit diagram of a power output device according to another embodiment.

As shown in FIG. 2, the snubber capacitor C1, which is connected in parallel to the battery B, may be omitted.

Figure 3:
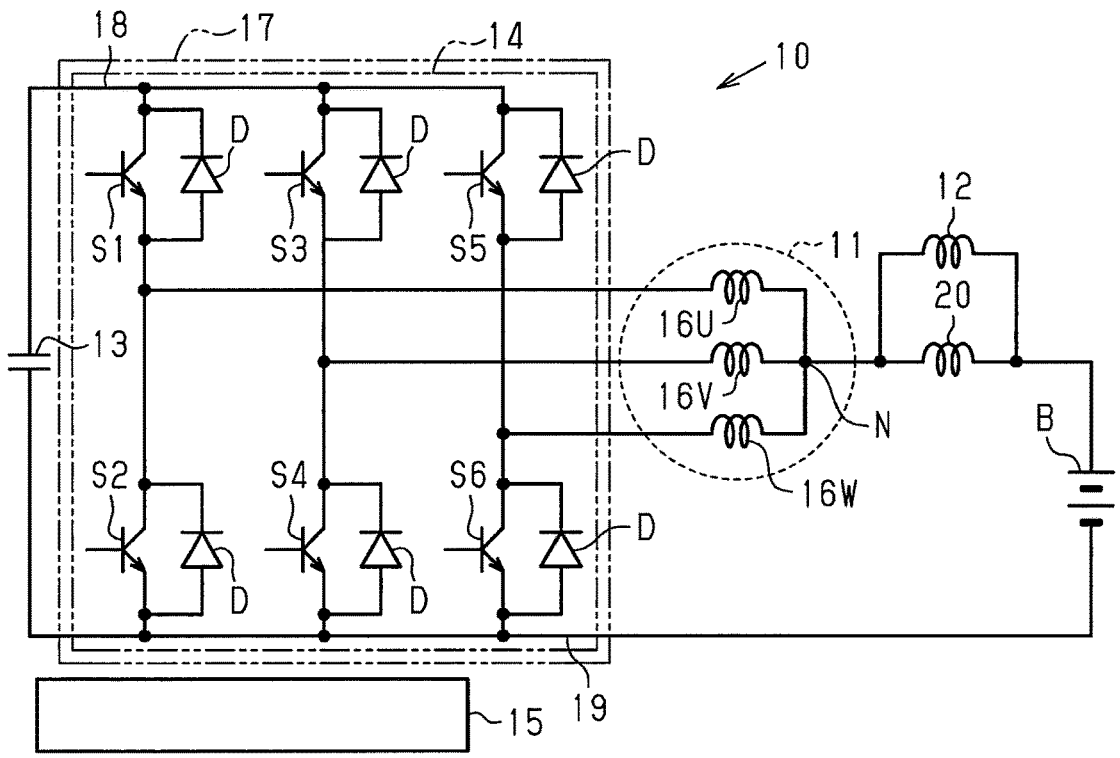
FIG. 3 is a circuit diagram of a power output device according to a further embodiment.

As shown in FIG. 3, a connection line 20 that functions as a leakage inductance may be connected in parallel to the field winding 12. Here, the term "leakage inductance" refers to the inductance of the connection line 20 (wire) that electrically connects the neutral point N and other components. The connection line 20 needs to be long enough so that the connection line 20 has sufficient inductance. Although the connection line 20 is short in the schematic diagram of FIG. 3, the connection line 20 needs to be long enough to obtain the intended inductance so that the connection line 20, which is connected in parallel to the field winding 12, has sufficient inductance. With this configuration, some of the current from the capacitor 13 that merges after flowing to the motor windings 16U, 16V, and 16W flows to the connection line 20. Accordingly, the leakage inductance of the connection line 20 can be used to regulate the amount of current flowing to the field winding 12. Thus, this configuration is preferred when there is no need for a large amount of current to flow to the field winding 12.

Figure 4:
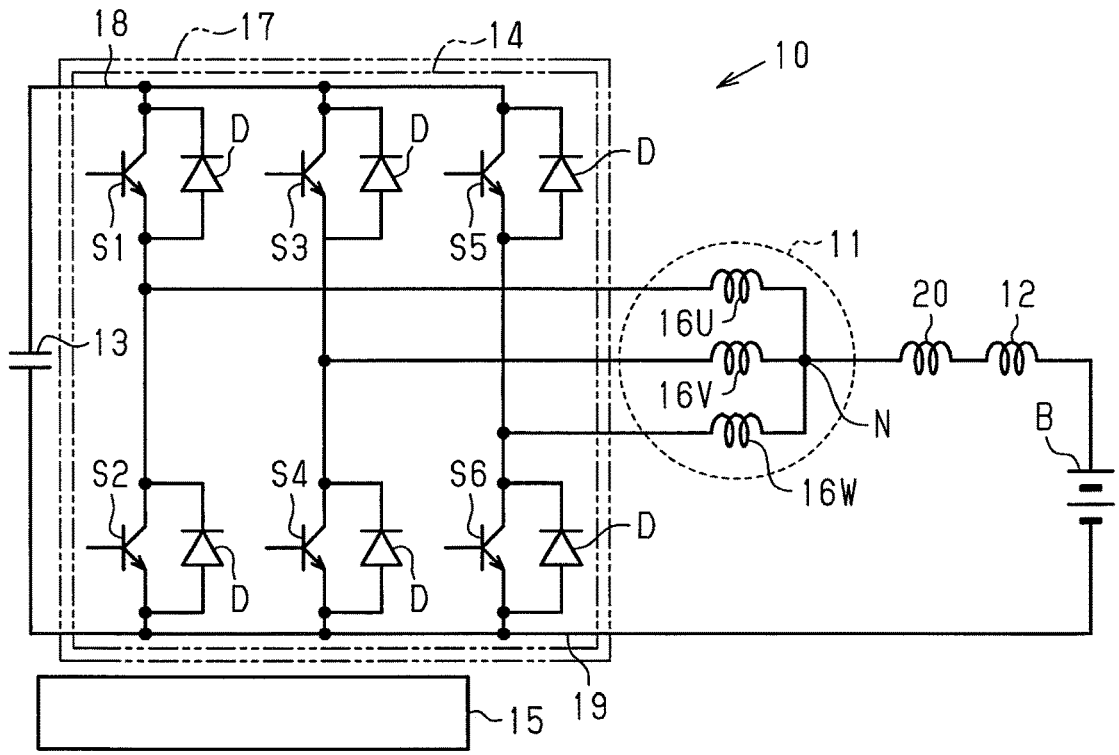
FIG. 4 is a circuit diagram of a power output device according to a further embodiment.

As shown in FIG. 4, the field winding 12 may be connected in series to the connection line 20 (leakage inductance).

For example, as shown by the double-dashed line in FIG. 1, the second end of the field winding 12 may be connected to the positive bus bar 18 instead of the negative bus bar 19 of the inverter circuit 14. That is, the field winding 12 may be connected to the positive bus bar 18 via the battery B.

The snubber capacitor C1 may be connected in parallel to the battery B in a configuration in which the field winding 12 is connected in parallel to the connection line 20 (leakage inductance) as shown in FIG. 3 or in a configuration in which the field winding 12 is connected in series to the connection line 20 (leakage inductance) as shown in FIG. 4.

The field winding motor is not limited to a type in which the field winding 12 is arranged on the rotor and may be of a type in which the field winding 12 is arranged on a stator such as the rotary electric machine disclosed in patent document 2. In patent document 2, in the same manner as the structure shown in FIG. 5, a stator 21 includes an armature winding 22 and a permanent magnet 23 in addition to the field winding 12. The permanent magnet 23 is located closer to a rotor 24 than the field winding 12 in a radial direction. However, the structure in patent document 2 differs from that in FIG. 5 in the number of rotor teeth of the rotor 24 and the number of stator teeth of the stator 21.

Figure 5:
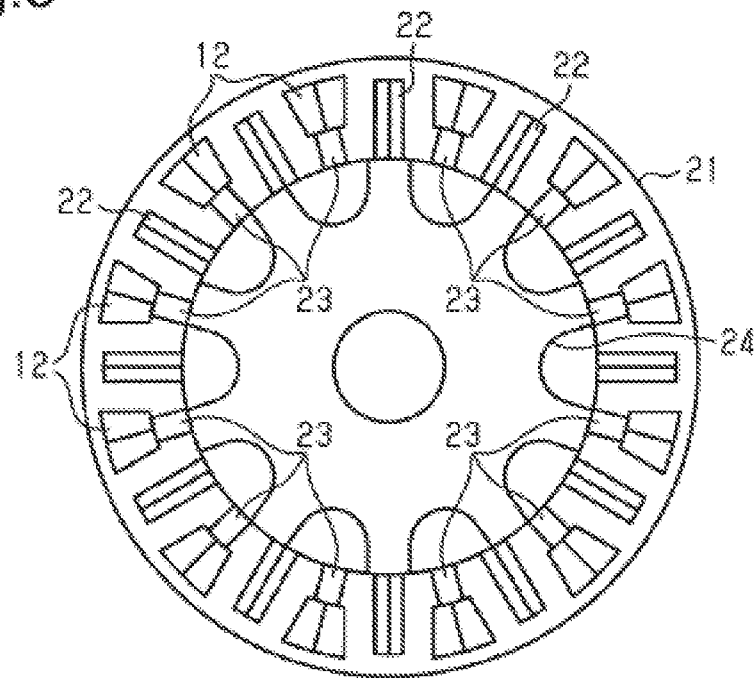
FIG. 5 is a schematic cross-sectional view showing a motor of a further embodiment.
Figure 6:
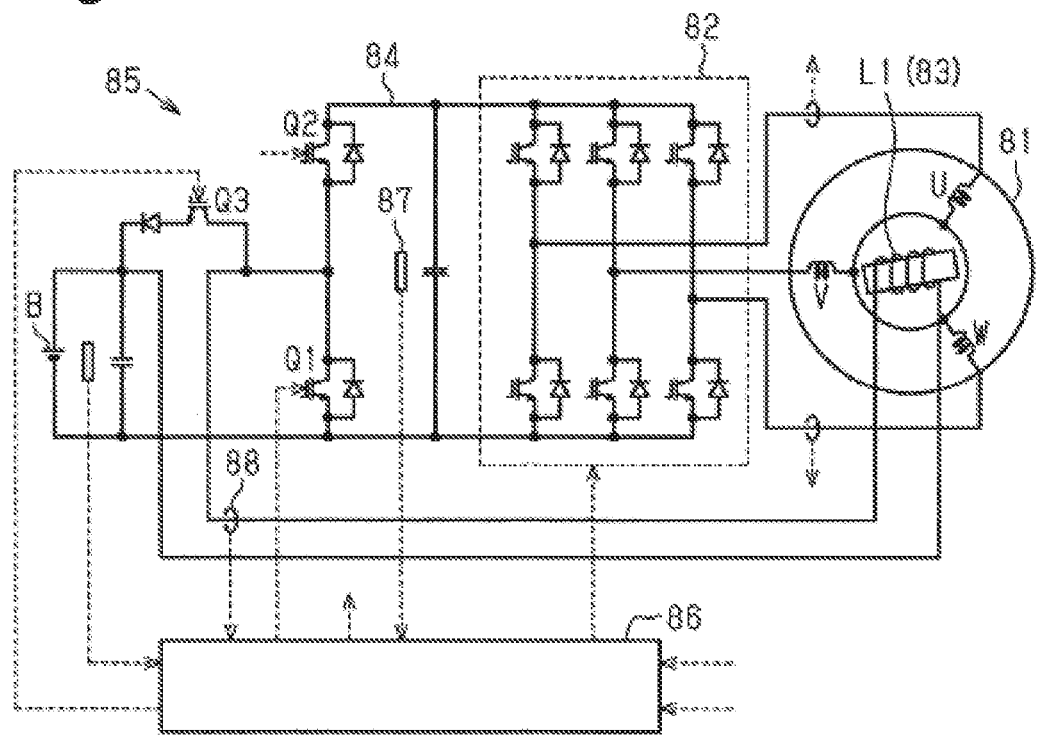
FIG. 6 is a schematic block diagram showing a prior art motor-driving device.

Instead of the structure shown in FIG. 5, the permanent magnet 23 may be arranged at a radially outer side of the field winding 12.

The permanent magnet 23 may be omitted from a motor of the type having the field winding 12 on the stator.

The number of phases of the star-connected motor windings may be four or more. For example, the number of phases may be four or five.

The power output device 10 may be applied to an electrical machine installed in a vehicle other than an electric automobile. Further, the power output device 10 is not limited to vehicles and may be applied to industrial equipment or household appliances.

The invention claimed is:

1. A power output device comprising:
a field winding;
a motor including a plurality of star-connected motor windings having three or more phases;
a capacitor;
an inverter circuit configured to convert electric power supplied from the capacitor and supply the converted electric power to the motor windings;

a battery connected to the field winding; and
a controller, wherein
the inverter circuit includes a positive bus bar, a negative bus bar, and a plurality of switching element pairs respectively corresponding to the motor windings, wherein the switching element pairs each include an upper arm switching element and a lower arm switching element that are connected in series to each other,
the capacitor is connected to the positive bus bar and the negative bus bar,
the field winding is connected to one of the positive bus bar or the negative bus bar, and a neutral point of the motor, and
the controller is configured to control the switching element pairs to charge the capacitor by stepping up a voltage of the battery and to supply a direct current to the field winding.

2. The power output device according to claim 1, further comprising a connection line that is connected in parallel to the field winding and functions as a leakage inductance, wherein the connection line defines an inductive coil.

3. The power output device according to claim 1, further comprising a connection line that is connected in series with the field winding and functions as a leakage inductance, wherein the connection line defines an inductive coil.

4. The power output device according to claim 1, further comprising a snubber capacitor connected in parallel to the battery.

5. The power output device according to claim 1, wherein the field winding is connected to one of the positive bus bar or the negative bus bar via the battery.

6. The power output device of claim 1, wherein the controller is configured to actuate the plurality of switching element pairs of the inverter circuit as a step-up converter or a step-down converter to regulate a voltage of direct current output from the capacitor at a target voltage specified by the controller.

* * * * *